United States Patent [19]

Kershaw

[11] 4,224,047

[45] Sep. 23, 1980

[54] METHOD OF FUSING A SIGHT GLASS TO A METAL PART

[75] Inventor: Peter A. Kershaw, London, Canada

[73] Assignee: The Singer Company, Stamford, Conn.

[21] Appl. No.: 6,957

[22] Filed: Jan. 25, 1979

[51] Int. Cl.$^3$ .................................... C03C 27/02
[52] U.S. Cl. ........................................ 65/39; 65/59 R
[58] Field of Search ................... 65/59 R, 59 A, 59 B, 65/DIG. 1, 37, 39

[56] References Cited

U.S. PATENT DOCUMENTS

| 2,744,487 | 5/1956 | Moore et al. ............... 65/59 B X |
| 2,946,156 | 7/1960 | Bailey ........................ 65/59 B X |
| 3,281,606 | 10/1966 | Lueck ....................... 65/DIG. 1 X |
| 3,288,585 | 11/1966 | Clarke ....................... 65/59 B X |
| 3,347,651 | 10/1967 | Lueck ........................ 65/59 B X |
| 3,424,568 | 1/1969 | Martin et al. ................ 65/59 A |
| 3,582,300 | 6/1971 | Coombes et al. ............ 65/59 B X |
| 3,888,205 | 6/1975 | Vitticore et al. ............ 65/59 B X |
| 3,930,824 | 1/1976 | Knowles ..................... 65/59 R X |

FOREIGN PATENT DOCUMENTS 860434 2/1961 United Kingdom ................... 65/59 R

*Primary Examiner*—Richard V. Fisher
*Attorney, Agent, or Firm*—James M. Trygg; Robert E. Smith; Edward L. Bell

[57] ABSTRACT

The instant invention provides, in combination, a metal part having a cylindrical opening, a chamfer below the cylindrical opening, and an aperture below the chamfer, the diameter of the cylindrical opening being less than the diameter of the aperture at the juncture of the aperture and the chamfer, and glass fused only to the wall of the cylindrical opening.

The invention also provides a method of fusing a glass sphere to a metal part, comprising providing the metal part with a cylindrical opening, a chamfer below the cylindrical opening, and an aperture below the chamfer, the diameter of the cylindrical opening being less than the diameter of the aperture at the juncture of the aperture and the chamfer, placing a glass sphere having a diameter slightly larger than the diameter of the cylindrical opening within the cylindrical opening, and heating the glass sphere sufficiently to soften the glass whereby the glass will flow downwardly by gravity through the cylindrical opening to the juncture of the cylindrical opening and the chamfer, and wherein the downward flow of the glass is limited by cohesive forces in the glass that substantially prevent the glass from flowing radially outwardly along the chamfer, and whereby the softened glass becomes fused to the wall of the cylindrical opening.

7 Claims, 4 Drawing Figures

METHOD OF FUSING A SIGHT GLASS TO A METAL PART

DESCRIPTION

Background of the Invention

The instant invention relates to sight glasses or the like and a method for manufacturing the same, and more particularly to a method of fusing a glass sphere to a metal part.

In making sight glasses, glass is fused into a wall of an opening in a metal part. The opening is typically utilized to permit observation of fluid flow or activity within the metal part. Sight glasses are commonly used in drier receivers, which are components of air conditioning systems, the function of the drier receiver being to dehydrate and filter the refrigerant medium. A sight glass permits viewing of the condition of the refrigerant, such as the presence or absence of gas bubbles in the liquid flow.

In fusing glass to the opening in the metal, glass is softened and allowed to flow downwardly into the opening, the extent of its downward flow conventionally being limited by a carbon chuck placed in the opening as a physical barrier to the softened glass. The carbon chuck is removed once the glass has sufficiently cooled. Another method of fusing the glass to the metal opening is disclosed in U.S. Pat. No. 3,888,205, issued June 10, 1975, in which glass disks and a particular arrangement of bores, openings, counterbores and transverse surfaces are utilized to limit glass flow to a particular area. Both of these methods are complex and expensive. Applicant therefor provides a sight glass and a method of making a sight glass which is both simpler and less expensive than any of those in the prior art.

SUMMARY OF THE INVENTION

The instant invention provides, in combination, a metal part having a cylindrical opening, a chamfer below the cylindrical opening, and an aperture below the chamfer, the diameter of the cylindrical opening being less than the diameter of the aperture at the juncture of the aperture and the chamfer, and glass fused only to the wall of the cylindrical opening.

The invention also provides a method of fusing a glass sphere to a metal part, comprising providing the metal part with a cylindrical opening, a chamfer below the cylindrical opening, and an aperture below the chamfer, the diameter of the cylindrical opening being less than the diameter of the aperture at the juncture of the aperture and the chamfer, placing a glass sphere having a diameter slightly larger than the diameter of the cylindrical opening within the cylindrical opening, and heating the glass sphere sufficiently to soften the glass whereby the glass will flow downwardly by gravity through the cylindrical opening to the juncture of the cylindrical opening and the chamfer, and wherein the downward flow of the glass is limited by cohesive forces in the glass that substantially prevent the glass from flowing radially outwardly along the chamfer, and whereby the softened glass becomes fused to the wall of the cylindrical opening.

DESCRIPTION OF THE PREFERRED EMBODIMENT

Figure 1:
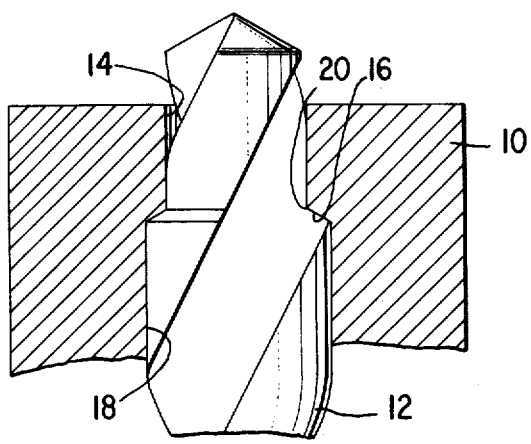
FIG. 1 is a vertical, sectional view of a metal part being drilled in accordance with the instant invention.
Figure 2:
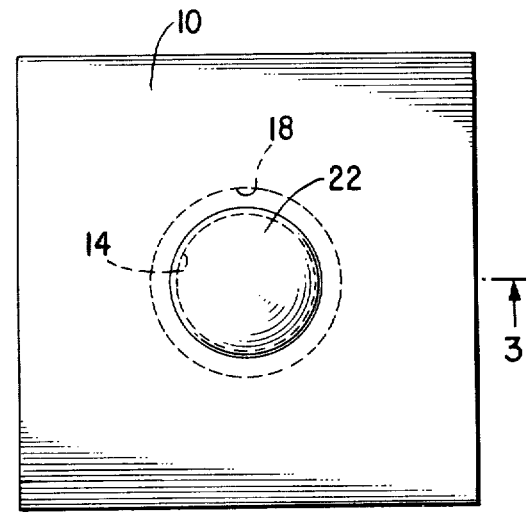
FIG. 2 is a top plan view of the metal part in FIG. 1 after it has been drilled, with a glass sphere located in the drilled opening.

In describing the preferred embodiment of the instant invention, reference is made to the drawings, wherein there is seen a steel block 10 being drilled by a two-step drill bit 12 (see FIG. 1). The use of the two-step drill bit 12 permits the steel block 10 to have a cylindrical opening 14, a chamfer 16 below the cylindrical opening 14, and an aperture 18 situated beneath the chamfer 16 machined therein in one basic operation. The angle $\theta$ (see FIG. 3) between the wall of the cylindrical opening 14 and the wall of the chamfer 16 is preferably about 240 degrees, but may vary between about 240 and 270 degrees, and preferably between about 240 and 260 degrees. The juncture 20 of the cylindrical opening 14 and the chamfer 16 should be sharp, that is, about 0.005 inch maximum radius.

Figure 3:
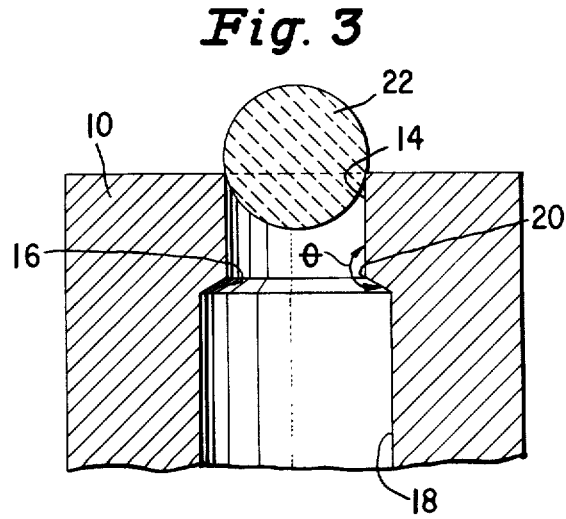
FIG. 3 is a sectional view taken on the vertical plane indicated by the line 3—3 in FIG. 2.
Figure 4:
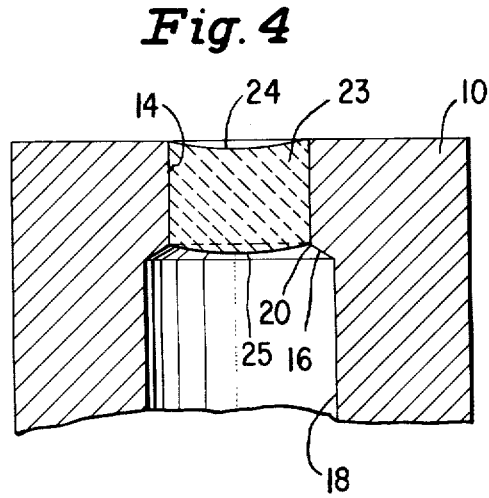
FIG. 4 is a vertical, sectional view of the metal part and glass after the glass sphere has been softened and fused to the metal part.

Once the steel block 10 has been provided with the desired cylindrical opening 14, chamfer 16 and aperture 18, a glass sphere 22 with a diameter slightly larger than the diameter of the cylindrical opening 14 is located within the cylindrical opening 14, as best seen in FIG. 3. The glass is preferably a soda lime glass having a softening point of about 505° C. The metal block 10 and the glass sphere 22 are then subjected to a temperature high enough to soften the glass sphere 22 and to cause the glass to flow downwardly by gravity through the cylindrical opening 14 to the juncture 20 of the cylindrical opening 14 and the chamfer 16. The presence of the sharp juncture 20 assures that the cohesive force in the glass will limit the downward flow of the glass to the juncture 20 and prevents the glass from flowing radially outwardly onto the chamfer 16. The softened glass contacts the wall of the cylindrical opening 14 and assumes the shape of a sight glass 23 as shown in FIG. 4, i.e. the lower surface 25 of the glass is convexly curved and the upper surface forms a meniscus 24. The downward flow of the glass results in a large area of fused contact between the sight glass 23 and the wall of the cylindrical opening 14.

Excellent results were obtained when the initial diameter of a soda lime glass sphere 22 was 6 m.m., the diameter of the cylindrical opening 14 was 0.232, the height of the cylindrical opening 14 was 0.170 inch, the diameter of the aperture 18 was 0.280 inch, and the angle $\theta$ was 240 degrees. A two-step drill was used to machine the metal part 10.

It will be understood that various changes in the details, materials, arrangements of parts and operating conditions which have been herein described and illustrated in order to explain the nature of the invention may be made by those skilled in the art within the principles and scope of the invention.

I claim:

1. A method of making a composite part consisting of a metal part and a sight glass fused thereto comprising:
    providing the metal part with a cylindrical opening, a chamfer below the cylindrical opening, and an aperture below the chamfer, and wherein the diameter of the cylindrical opening is less than the diameter of the aperture at the juncture of the aperture and the chamfer;

placing a glass sphere having a diameter slightly larger than the diameter of the cylindrical opening within the cylindrical opening; and heating the glass sphere sufficiently to soften the glass to the point wherein the softened glass will flow downwardly by gravity through the cylindrical opening only to the juncture of the cylindrical opening and the chamfer, and wherein the downward flow of the softened glass is limited by cohesive forces in the softened glass that substantially prevent the softened glass from flowing radially outwardly along the chamfer, and then cooling the softened glass causing it to become fused to the wall of the cylindrical opening.

2. The method of claim 1, in which the cylindrical opening, the chamfer and the aperture are formed in the metal part by a two-step drill in one basic operation.

3. The method of claim 1, in which the angle between the wall of the cylindrical opening and the wall of the chamfer is between about 240 and 270 degrees.

4. The method of claim 1, in which the angle between the wall of the cylindrical opening and the wall of the chamfer is between about 240 and 260 degrees.

5. The method of claim 1, in which the angle between the wall of the cylindrical opening and the wall of the chamfer is about 240 degrees.

6. The method of claim 1, in which the juncture of the cylindrical opening and the chamfer has a radius of 0.005 inch or less.

7. The method of claim 6, in which the glass sphere is a soda lime glass.

* * * * *